(12) United States Patent
Huang

(10) Patent No.: US 9,658,112 B2
(45) Date of Patent: May 23, 2017

(54) DYNAMIC PHASE ACQUIRING DEVICE

(71) Applicant: SHENZHEN ORBBEC CO., LTD., Shenzhen, Guangdong (CN)

(72) Inventor: Yuanhao Huang, Guangdong (CN)

(73) Assignee: SHENZHEN ORBBEC CO., LTD., Shenzhen (CN)

( * ) Notice: Subject to any disclaimer, the term of this patent is extended or adjusted under 35 U.S.C. 154(b) by 21 days.

(21) Appl. No.: 14/771,324

(22) PCT Filed: Mar. 10, 2014

(86) PCT No.: PCT/CN2014/073141
§ 371 (c)(1),
(2) Date: Aug. 28, 2015

(87) PCT Pub. No.: WO2014/135128
PCT Pub. Date: Sep. 12, 2014

(65) Prior Publication Data
US 2016/0003682 A1 Jan. 7, 2016

(30) Foreign Application Priority Data
Mar. 8, 2013 (CN) .......................... 2013 1 0074241

(51) Int. Cl.
*G01J 9/00* (2006.01)
*G01J 9/02* (2006.01)
(52) U.S. Cl.
CPC .. *G01J 9/00* (2013.01); *G01J 9/02* (2013.01)
(58) Field of Classification Search
CPC ...................................... G01J 9/00; G01J 9/02
(Continued)

(56) References Cited

U.S. PATENT DOCUMENTS 5,995,223 A 11/1999 Power
7,557,929 B2 * 7/2009 Fang-Yen ............ A61B 5/1455
356/484
(Continued)

FOREIGN PATENT DOCUMENTS

CN 102269627 A 12/2011
CN 102425988 A 4/2012
(Continued)

OTHER PUBLICATIONS

PCT International Search Report dated Jun. 16, 2014, issued in corresponding International Application No. PCT/CN2014/073141 (8 pages).

*Primary Examiner* — Kevin Pyo

(57) ABSTRACT

A dynamic phase acquisition device includes a light collecting opening, a semi-reflecting and semi-transmitting mirror, a phase shifter, a polarizer, a plane reflector, a photosensing element and a phase processor. In the dynamic phase acquisition device, light passes through the light collecting opening to the semi-reflecting and semi-transmitting mirror, and then is divided into two channels. One channel of the light sequentially passes through the phase shifter, the polarizer to the photosensing element, to form a first image; the other channel of the light, after being reflected by the plane reflector, directly passes through the polarizer to the photosensing element, to form a second image. The photosensing element sends the first image and the second image to the phase processor, and the phase processor obtains phase data; and a leading or lagging phase shift range of the phase shifter is 1 degree to 20 degrees. By using the phase shifter to provide a lead or a lag of a small amount of degrees, such as from 1 to 20 degrees, or even from 5 to 10 degrees, phase data can be obtained via two-path image detection, thus eliminating the need for optical elements for at least one path (Continued)

detection, and thereby simplifying the structure and reducing costs.

<p align="center"><b>5 Claims, 1 Drawing Sheet</b></p>

(58) Field of Classification Search
 USPC .................. 250/208.1; 356/453, 491, 512
 See application file for complete search history.

(56) References Cited

U.S. PATENT DOCUMENTS

| | | |
|---|---|---|
| 2008/0007248 A1 | 1/2008 | Zyss et al. |
| 2008/0157867 A1* | 7/2008 | Krah .................. G06F 3/044 |
| | | 329/304 |

FOREIGN PATENT DOCUMENTS

| | | |
|---|---|---|
| CN | 102735184 A | 10/2012 |
| CN | 103148949 A | 6/2013 |
| JP | H 08-110266 A | 4/1996 |
| JP | 2001-059775 A | 3/2001 |
| JP | 2011-112358 A | 6/2011 |

* cited by examiner

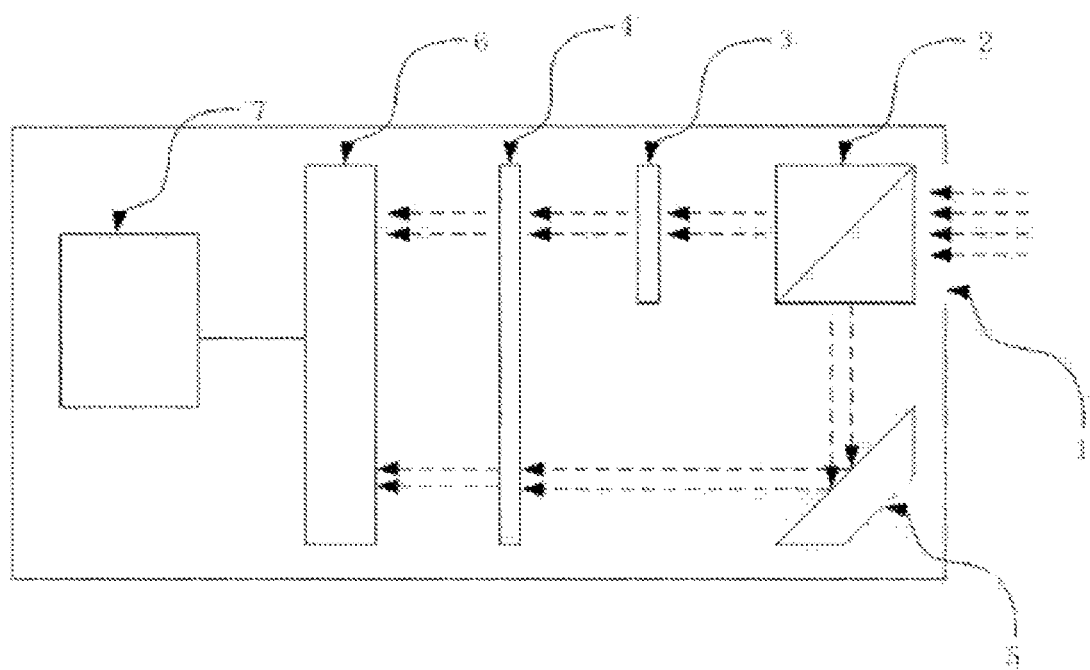

DYNAMIC PHASE ACQUIRING DEVICE

CROSS-REFERENCE TO RELATED APPLICATION

The present application is a national stage application of International Application No. PCT/CN2014/073141, filed on Mar. 10, 2014, which claims the benefit of Chinese Patent Application No. 201310074241.6, filed on Mar. 8, 2013. The contents of both of the above-referenced applications are herein incorporated by reference in their entirety.

TECHNICAL FIELD

The present invention relates to the field of phase calculation technologies, and in particular, to a dynamic phase acquisition device.

BACKGROUND

The existing phase calculation must obtain three or more images of different phases, for example, 0, Π/2 and Π, and then phase data is calculated according to the three images. Such detection is relatively easy to implement for stationary objects, while for moving objects, as it is necessary to set at least three channels of optical elements for image detection, the structure is complicated and the cost is also very high.

SUMMARY

In order to solve the foregoing existing technical problems, the present invention provides a dynamic phase acquisition device, which can obtain dynamic phase data by setting two channels of optical elements for image detection.

The present invention, in order to solve the foregoing existing technical problems, provides a dynamic phase acquisition device, including: a light collecting opening, a semi-reflecting and semi-transmitting mirror, a phase shifter, a polarizer, a plane reflector, a photosensing element and a phase processor. In the dynamic phase acquisition device, light passes through the light collecting opening to the semi-reflecting and semi-transmitting mirror, and then is divided into two channels. One channel of the light sequentially passes through the phase shifter, the polarizer to the photosensing element, to form a first image; the other channel of the light, after being reflected by the plane reflector, directly passes through the polarizer to the photosensing element, to form a second image. Pixels of the first image one-to-one correspond to pixels of the second image. The photo sensing element is connected with the phase processor. The photosensing element sends the first image and the second image to the phase processor, and the phase processor obtains phase data; and a leading or lagging phase shift range of the phase shifter may be 1 degree to 20 degrees.

Further improvements to the present invention are described as follows.

The leading or lagging phase shift range of the phase shifter may be 5 degrees to 10 degrees.

The photosensing element forms the first image and the second image at the same time.

Compared with the prior art, beneficial effects of the present invention are as follows: by using a phase shifter to advance or lag a small amount of degrees, for example, 1 degree to 20 degrees or even 5 degrees to 10 degrees, phase data can be obtained through two channels of image detection, which saves one channel of optical elements for image detection, thus simplifying the structure and reducing the cost. At the same time, the detection is not only applicable to stationary objects but also applicable to dynamic objects.

BRIEF DESCRIPTION OF THE DRAWINGS

FIG. 1 is a schematic structural diagram of a dynamic phase acquisition device according to the present invention.

DETAILED DESCRIPTION

The present invention is further described below in combination with the description of the accompanying drawing and specific implementations.

As shown in FIG. 1, a dynamic phase acquisition device includes: a light collecting opening 1, a semi-reflecting and semi-transmitting mirror 2, a phase shifter 3, a polarizer 4, a plane reflector 5, a photosensing element 6 and a phase processor 7. In the dynamic phase acquisition device, light passes through the light collecting opening 1 to the semi-reflecting and semi-transmitting mirror 2, and then is divided into two channels. One channel of the light sequentially passes through the phase shifter 3, the polarizer 4 to the photosensing element 6, to form a first image; the other channel of the light, after being reflected by the plane reflector 5, directly passes through the polarizer 4 to the photosensing element 6, to form a second image. Pixels of the first image one-to-one correspond to pixels of the second image. The photosensing element 6 is connected with the phase processor 7. The photosensing element 6 sends the first image and the second image to the phase processor 7, and the phase processor 7 obtains phase data. A leading or lagging phase shift range of the phase shifter 3 may be 1 degree to 20 degrees. As a phase difference range of two images is 1 degree to 20 degrees, which is far less than the current general Π/2 and Π, phases of detected opposite angles can be analyzed and obtained in combination with optical path characteristics of the present invention.

In another embodiment, the leading or lagging phase shift range of the phase shifter 3 may be 5 degrees to 10 degrees, and at this point, the detection effect is also good.

By using the phase shifter 3 to advance or lag a small amount of degrees, for example, 1 degree to 20 degrees or even 5 degrees to 10 degrees, phase data can be obtained through two channels of image detection, which saves one channel of optical elements for image detection, thus simplifying the structure and reducing the cost. Moreover, the present invention only uses one photosensing element 6, and the first image and the second image are imaged on the photosensing element 6 at the same time, which further saves the number of the photosensing element 6.

The foregoing contents are detailed descriptions of the present invention in combination with specific preferred implementations. It cannot be concluded that the specific implementations of the present invention are merely limited to the above descriptions. Those of ordinary skill in the art can also make several simple deductions or replacements without departing from the concept of the present invention, and the deductions or replacements should be regarded as falling within the protection scope of the present invention.

The invention claimed is:
1. A dynamic phase acquisition device, comprising:
    a light collecting opening, a semi-reflecting and semi-transmitting mirror, a phase shifter, a polarizer, a plane reflector, a photosensing element and a phase processor;
    wherein:
    light passes through the light collecting opening to the semi-reflecting and semi-transmitting mirror, and is divided into two channels, one channel of the light sequentially passes through the phase shifter, the polar- izer to the photosensing element, to form a first image; the other channel of the light, after being reflected by the plane reflector, passes through the polarizer to the photosensing element, to form a second image; the first and second images are formed at the same time; pixels of the first image one-to-one correspond to pixels of the second image;

the photosensing element is connected with the phase processor; the photosensing element sends the first image and the second image to the phase processor, and the phase processor obtains phase data; and a leading or lagging phase shift range of the phase shifter is 1 degree to 20 degrees.

2. The dynamic phase acquisition device of claim 1, wherein the leading or lagging phase shift range of the phase shifter is 5 degrees to 10 degrees.

3. A dynamic phase acquisition device, comprising:
- a first channel including a semi-reflecting and semi-transmitting mirror, a phase shifter, and a polarizer;
- a second channel including the semi-reflecting and semi-transmitting mirror, a reflector, and the polarizer;
- a photosensing element for receiving light from the first channel and the second channel and generating a first image and a second image at the same time; and
- a phase processor connected to the photosensing element for receiving the first image and second image and calculating phase data based on the received first image and second image.

4. The dynamic phase acquisition device of claim 3, wherein the phase shifter is configured to shift phase 1 degree to 20 degrees.

5. The dynamic phase acquisition device of claim 3, wherein the phase shifter is configured to shift phase 5 degrees to 10 degrees.

* * * * *